Patented Nov. 19, 1946

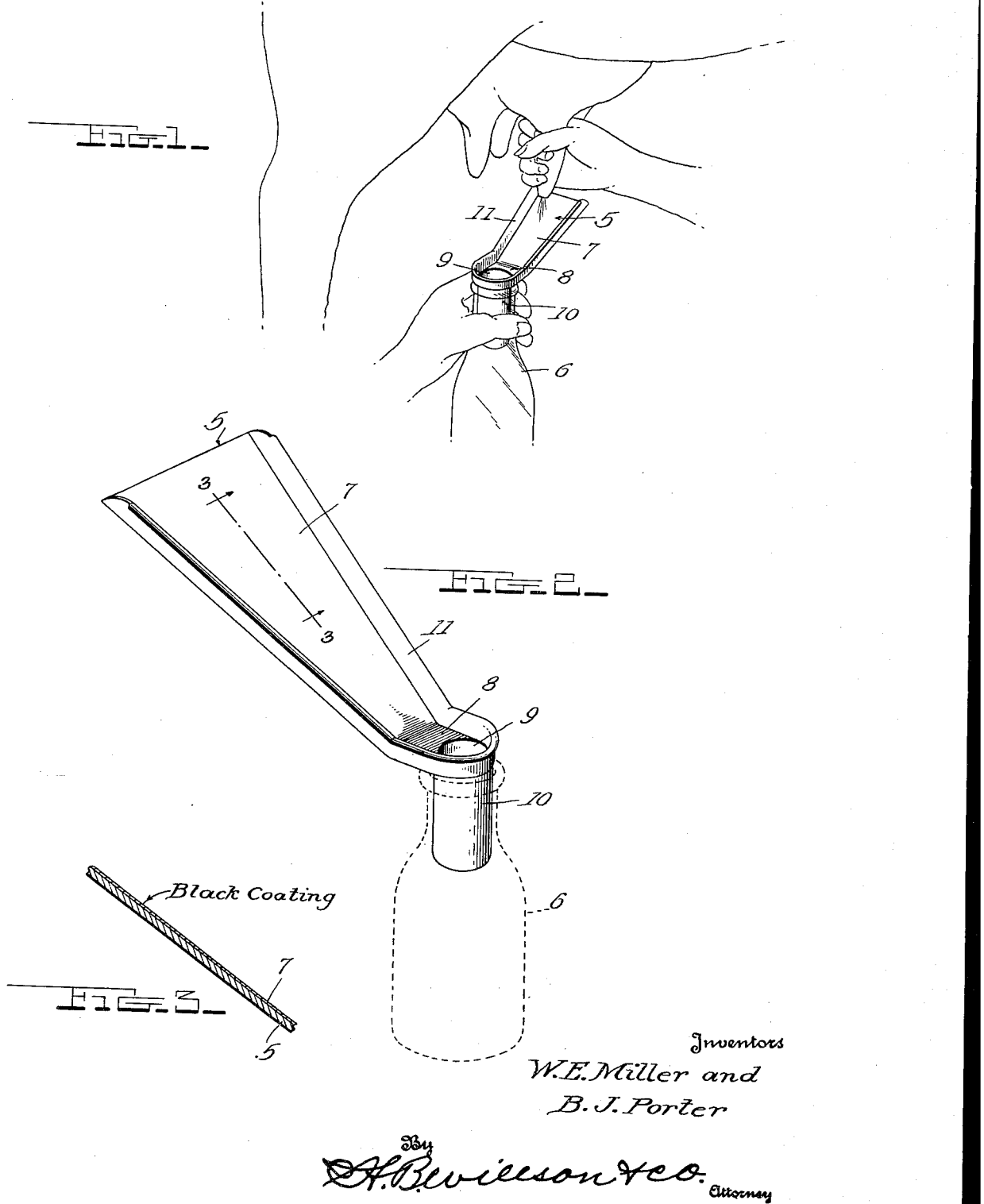

2,411,384

UNITED STATES PATENT OFFICE 2,411,384

VISUAL MILK TESTER

Ward E. Miller and Bennett Jay Porter, Albert Lea, Minn.

Application July 6, 1945, Serial No. 603,436

1 Claim. (Cl. 88—14)

The invention aims to provide an extremely simple and inexpensive device for visually testing milk as it comes from a cow's udder, to determine whether any indication of mastitis or garget is visible. It is an improvement upon what is known as the strip cup which is simply a cup covered with a fine wire screen or black cloth onto which streams of milk from each quarter are projected immediately before the animal is milked.

In carrying out the above end, a further object is to provide a test plate which declines to a receptacle, said plate being adapted to receive milk from a cow's udder and to direct the milk downwardly to the receptacle in a film which may be readily viewed.

A still further object is to provide a novel testing device which may be easily connected with an ordinary milk bottle, the latter forming the aforesaid receptacle.

Figure 1 of the accompanying drawing is a perspective view showing the manner of using the device.

Fig. 2 is a perspective view on a larger scale.

Fig. 3 is a detail sectional view on line 3—3 of Fig. 1.

An inclined plate 5 is provided to receive milk directly from a cow's udder as seen in Fig. 1, and to direct the milk to a receptacle 6 connected with the lower end of said plate. The plate is imperforate and of generally rectangular, elongated shape so that it extends entirely to one side of the receptacle. At least the upper side of the plate 5 is of some dark color, preferably black, formed for example, by a coating 7 of paint, enamel or the like. As the film of milk runs down the plate 5, if the cow has even a very mild infection of mastitis or garget, tiny flakes or particles of coagulation will appear on the dark surface of said plate and the infection may be readily detected. It is thus, a quick and easy matter to periodically test the milk from even a large number of cows, whereas prior ways of accomplishing this have been time consuming and arduous.

In the preferred construction, the plate 5 tapers toward its lower end and terminates in a horizontal lower end portion 8 having a discharge opening 9 directly communicating with a tubular spout 10 which is of a size to fit into the neck of an ordinary milk bottle, said spout 10 being rigidly secured to said plate portion 8. The spout 10 is preferably cylindrical and of a diameter to loosely fit in the neck of a standard milk bottle so that the device will be supported on the top of the bottle while the neck of the latter is held in one hand as shown in Fig. 1. The longitudinal edges and lower end of the plate are provided with a suitable milk-retaining wall 11 which serves also to reinforce said plate. Because of the size, shape and angular disposition of the plate, the milk does not splash and will flow down the elongated surface so that if there is any coagulation, it is immediately visible. The device has no fine mesh screen which will become clogged and need frequent cleaning as does the original strip cup when many cows are to be tested. The device being a one-piece article has no loose parts that must be adjusted and fastened, and hence, saves considerable time in testing a large herd. The construction is such that the device may be quickly and easily cleaned and hence, kept in a sanitary condition and also such that it may with ease be applied to and removed from the ordinary milk bottle.

The device may be easily and inexpensively manufactured from metal or plastic, may be sold at a reasonable price, and will be a highly advantageous article to anyone having one or more cows. If black material is used in manufacture, or a material of some other adequate dark color, the coating 7 will obviously be unnecessary.

While the details disclosed are preferred, variations may be made within the scope of the invention as claimed.

What is claimed is:

A visual milk tester for support on a bottle having a cylindrical neck comprising an imperforate plate having an inclined, elongated portion and a horizontal portion at the lower end of said inclined portion, the latter having an upper surface of dark color upon which a descending film of milk may be readily viewed, a downwardly projecting spout having its upper end fixed to said horizontal portion to receive milk passing over said plate, said spout being cylindrical and of a diameter to fit in the neck of the supporting bottle whereby the plate will project laterally and upwardly from one side of the bottle, and an upstanding milk-retaining wall fixed to the side edges of said plate and extending around a portion of the upper end of said spout.

WARD E. MILLER.
BENNETT JAY PORTER.